(12) United States Patent
Specht

(10) Patent No.: US 6,328,242 B1
(45) Date of Patent: Dec. 11, 2001

(54) SEAT BELT RETRACTOR

(75) Inventor: Martin Specht, Fedafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/511,923

(22) Filed: Feb. 24, 2000

(30) Foreign Application Priority Data

Jul. 5, 1999 (DE) .............................................. 199 30 958

(51) Int. Cl.[7] .................................................. B65H 75/48
(52) U.S. Cl. .......................................................... 242/375.1
(58) Field of Search ................................ 242/375.1, 373, 242/375.3; 280/806, 807; 297/475, 476, 477, 478; 185/37, 40 H

(56) References Cited

U.S. PATENT DOCUMENTS

| | | | |
|---|---|---|---|
| 4,561,677 | * 12/1985 | Kawai | 280/807 X |
| 4,902,039 | * 2/1990 | Kawai et al. | 280/807 X |
| 5,628,470 | * 5/1997 | Ray et al. | 242/375.3 |
| 5,816,522 | * 10/1998 | Krambeck et al. | 242/375.3 |
| 6,211,793 | * 4/2001 | Smithson | 280/807 X |

FOREIGN PATENT DOCUMENTS

| | | |
|---|---|---|
| 2742676 | 9/1977 | (DE) . |
| 4112620 | 4/1991 | (DE) . |
| 4302042 | 1/1993 | (DE) . |
| 0893313 | 7/1998 | (EP) . |

* cited by examiner

*Primary Examiner*—William A. Rivera
(74) *Attorney, Agent, or Firm*—Lonnie Drayer; Beth Vrioni

(57) ABSTRACT

A seat belt retractor for a vehicle with a rotatably mounted belt reel on which a seat belt can be wound and unwound has a biased motive spring that acts on the belt reel to produce a pulling force which acts on the seat belt, and during winding and unwinding follows a characteristic curve which is dependent on the extracted length of belt webbing. An electric motor drive adjusts the bias of the motive spring in such a way that the pulling force follows a characteristic curve corresponding to room temperature, which is approximately 20° C., at any temperature.

6 Claims, 1 Drawing Sheet

SEAT BELT RETRACTOR

FIELD OF THE INVENTION

The invention relates to a seat belt retractor.

DISCUSSION OF THE PRIOR ART

A seat belt retractor of this type is known from EP 0 893 313 A2. The known seat belt retractor has a belt reel which is rotatably mounted on a retractor frame and on which a seat belt can be wound and unwound. A biased motive spring acts on the belt reel in order to produce a pulling force acting on the seat belt. During the winding and unwinding of the belt webbing, the pulling force acting on the seat belt follows a characteristic curve which is dependent on the extracted length of belt webbing. An electric motor drive with which the pulling force produced by the motive spring can be adjusted is also provided.

SUMMARY OF THE INVENTION

In the present invention the mode of operation of the motive spring is improved in that the pulling force which it produces on the belt webbing follows a characteristic curve corresponding to room temperature (approximately 20° C.) at any temperature. Measurements have shown that at different temperatures, for example in a temperature range of −40° C. to +80° C., the pulling force acting on the belt webbing follows different characteristic curves in hysteresis form as a function of the extracted length of the belt webbing during winding and unwinding. At temperatures different from room temperature, the comfort in wear of the applied seat belt is considerably impaired with known seat belt retractors. The invention rectifies this in that, owing to the drive acting on the motive spring, in particular an electric motor drive, the spring force is so adjusted that the pulling force acting on the belt webbing follows a characteristic curve corresponding to room temperature, at any temperature differing from room temperature.

A temperature-measuring device can be provided for this purpose, which measures the ambient temperature in the region of the seat belt retractor. The force of the motive spring is adjusted by the drive as a function of the measured temperature.

This can be affected in that, when the ambient temperature is lower than room temperature, the bias of the motive spring is reduced by the drive, and when ambient temperatures are higher than room temperature, the bias of the motive spring is increased by the drive. For this purpose, the fixing point at which the motive spring is supported externally can be rotated round the spring core in the corresponding direction of rotation.

According to a further embodiment, the characteristic curve corresponding to room temperature can be stored in an electronic memory and the respective force or bias of the motive spring can be adjusted as a function of the setpoints predetermined by the stored characteristic curve for the pulling force acting on the belt webbing. A force measuring device which supplies the measured value in the control circuit for adjusting the force of the motive spring can be provided in the flow of force between the motive spring and the seat belt or also at the point where the bias of the motive spring is supported.

BRIEF DESCRIPTION OF THE DRAWINGS

An embodiment of the invention will be described in more detail with reference to the figures, in which.

DETAILED DESCRIPTION OF THE INVENTION

Figure 1:
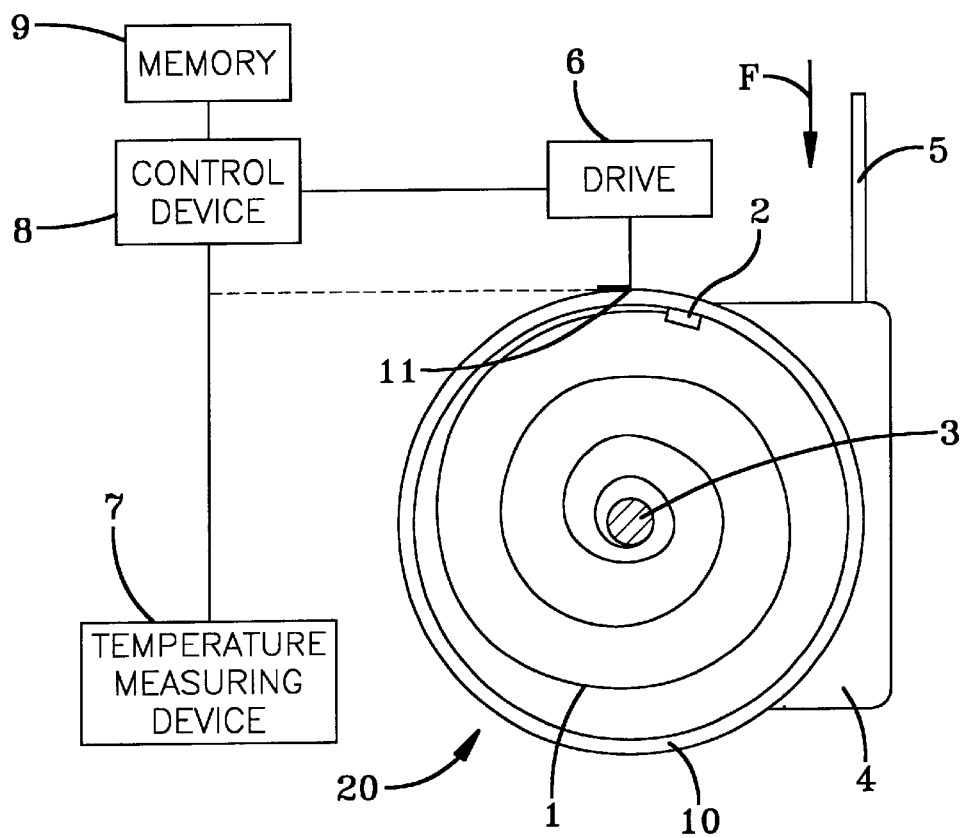
FIG. 1 is a schematic block diagram of a seat belt retractor with a control device for spring force adjustment.

FIG. 1 is a schematic view of a seat belt retractor. Only the components of the seat belt retractor required for understanding the invention are shown here. The seat belt illustrated possesses a retractor frame 4 on which a belt reel 20 not shown in detail is rotatably mounted in a known manner. Belt webbing 5 of a seat belt can be wound and unwound on the belt reel 20. A motive spring 1 is connected by one of its ends to a spring core 3 which is connected in a force-locked manner, in particular rigidly, to the belt reel 20 during normal winding and unwinding operation and transmits the pulling force F produced by the motive spring 1 onto the belt webbing 5. At its outer end, the motive spring 1 is connected to a ring 10 at a fixing point 2. The ring 10 is mounted rotatably relative to the retractor frame 4. The axis of the ring 10 and the belt reel axis preferably extend coaxially. A drive, in particular electric motor drive 6, makes a driving connection with the ring 10. The driving connection between the ring 10 can be produced in the manner known from EP 0 893 313 A2 or from DE 27 42 676 A1 or from DE 41 12 620 A1. The ring 10 can also be formed by the rotor of a flat motor, as described in DE 199 27 731 A1. A flat motor of this type is also known from DE 43 02 042 A1. The electric motor drive 6 is preferably designed as a collector-free d.c. motor of which the poles provided on the rotor are designed as permanent magnets. Owing to this preferred embodiment, a holding force which is adequate for supporting the motive spring 1 between the poles of the rotor and the poles of the stator is achieved during the normal winding and unwinding operation when the motor is switched off.

Operation of the drive 6 is controlled by a control device 8. A temperature measuring device 7 in the form of a temperature probe or sensor or the like is connected to the control device 8. The temperature-measuring device 7 emits an electric signal proportional to the ambient temperature to the control device 8. The ambient temperature corresponds to the temperature prevailing at the site of installation of the seat belt retractor in the vehicle, in particular the motor vehicle. The temperature-measuring device 7 can be provided on the seat belt retractor frame 4 or a housing of the seat belt retractor not shown in detail or in the immediate vicinity of the seat belt retractor.

Figure 2:
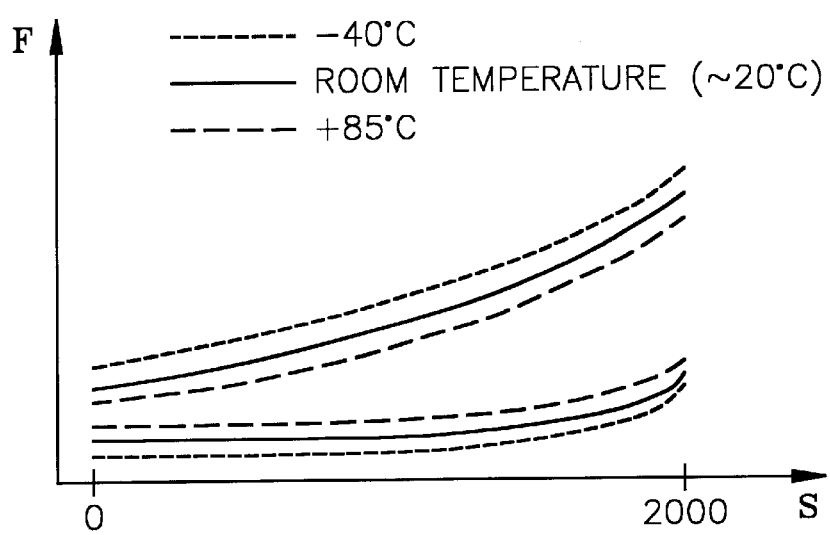
FIG. 2 is a schematic view of characteristic curves of the pulling force acting on the belt webbing at different temperatures.

The control device 8, in particular an electronic control device, can be connected to a setpoint memory 9 that is also electronic. At least the characteristic curve of the pulling force acting on the seat belt, which follows the pulling force at room temperature as a function of the extracted length during winding and unwinding, is stored in the setpoint memory 9. This characteristic curve which has a hysteresis form is shown as a solid line in FIG. 2. Room temperature is assumed to be approximately 20° C.

At lower temperatures, for example at −40° C., the characteristic curve of the pulling force acting on the seat belt has approximately the course shown as a dotted line. At higher temperatures, for example at +85° C., the characteristic curve has the course shown as a dashed line in FIG. 2. The memory device 9 can also be designed in such a way that a plurality of characteristic curves of a temperature range, for example the temperature range extending from −40° C. to +80° C., can be stored in it. In this case, the manipulated variable can then be calculated in the electronically designed control device 8, with which the drive 6 is controlled in order to bring the bias of the motive spring 1 to such a value that the characteristic curve existing at the room temperature (approximately 20° C.) is provided for the pulling force F acting on the belt webbing 5.

In a further embodiment, a control circuit can be provided which measures the spring force resulting from the bias of the motive spring and acting on the belt webbing 5 as measured value. For this purpose, a means for measuring force 11, for example in the form of a strain gauge, can be provided in the flow of force between the motive spring 1 and the belt webbing 5. Preferably, the means for measuring force 11 can be provided at the inner fixing point of the motive spring at which it is connected to the spring core 3 or at the outer fixing point 2 of the motive spring. However, it is also possible to provide force measurement by means of a force transducer 11 between the outer fixing point 2 of the motive spring and the poles of the stator and rotor which supply the holding force for supporting the motive spring 1 during the normal winding and unwinding operation. This holding force can optionally be recorded as measured value. A signal proportional to the measured force, as shown in a dot-dash line in FIG. 1, is input in the control device 8 which acts as a controller in cooperation with the setpoint memory 9, in which the characteristic curve corresponding to room temperature is stored, and supplies an electric signal as manipulated variable for the drive 6 (actuator). The ring 10 is then correspondingly rotated by the drive 6 so that the bias of the spring 1 is adjusted in such a way that it supplies the respective pulling force predetermined by the characteristic curve on the belt webbing 5. At ambient temperatures lower than room temperature, the ring 10 is driven in such a way that the outer fixing point 2 of the motive spring 1 is moved in order to reduce the bias. With the arrangement in FIG. 1, this is a counterclockwise rotation. At ambient temperatures higher than room temperature, the ring 10 is adjusted by the drive 6 in such a way that the bias of the motive spring 1 is increased. For this purpose, the outer fixing point 2 of the motive spring is adjusted in a clockwise direction. This adjustment can also be made with direct control as a function of the temperatures measured by means of the temperature-measuring device 7.

It will be apparent to those skilled in the art that the above embodiments may incorporate changes and modifications without departing from the scope of this invention. It is intended to include all such modifications and alterations in so far as they come within the scope of the appended claims or the equivalents thereof.

I claim:

1. A seat belt retractor comprising a rotatably mounted belt reel on which a seat belt is wound and unwound, a biased motive spring which acts on the belt reel to produce a pulling force which acts on the seat belt and, during winding and unwinding, follows a characteristic curve which is dependent on the extracted length of belt webbing, and an electric motor drive with which the pulling force produced by the motive spring can be adjusted, bias of the motive spring is adjusted by the drive in such a way that the pulling force follows a characteristic curve corresponding to room temperature, which is approximately 20° C., at any temperature.

2. The seat belt retractor according to claim 1 further comprising a temperature measuring device located in a region of the seat belt retractor to measure ambient temperature at the seat belt retractor, wherein the force of the motive spring is adjusted by the drive as a function of the measured temperature.

3. The seat belt retractor according to claim 1 or 2 wherein the characteristic curve corresponding to room temperature is stored in an electronic memory and the respective force of the motive spring is adjusted as a function of the setpoints predetermined by the stored characteristic curve.

4. The seat belt retractor according to claim 3 further comprising means for measuring force in the flow of force between the motive spring and the seat belt, the means for measuring force supplies a measured value for the adjustment of the force of the motive spring.

5. The seat belt retractor according to one of claims 1,2, or 4 wherein at an ambient temperature lower than said room temperature, the drive reduces the bias of the motive spring and, at an ambient temperature higher than room temperature, the drive increases the bias of the motive spring.

6. The seat belt retractor according to claim 3 wherein at an ambient temperature lower than said room temperature, the drive reduces the bias of the motive spring and, at an ambient temperature higher than room temperature, the drive increases the bias of the motive spring.

* * * * *